United States Patent [19]

Susi et al.

[11] Patent Number: 5,332,212
[45] Date of Patent: Jul. 26, 1994

[54] COATED HOCKEY STICK BLADE

[75] Inventors: Michael F. Susi, Newington; William H. Stevenson, Bolton, both of Conn.

[73] Assignee: DSB Industries, Inc., Middletown, Conn.

[21] Appl. No.: 8,568

[22] Filed: Jan. 22, 1993

[51] Int. Cl.$^5$ .............................................. A03B 59/12
[52] U.S. Cl. .................................................. 273/67 A
[58] Field of Search ............... 273/67 A, 67 R, 72 R, 273/71 A, 173–175, 67 DC

[56] References Cited

U.S. PATENT DOCUMENTS

| | | | |
|---|---|---|---|
| 2,912,245 | 11/1959 | Gardner et al. | 273/67 A |
| 3,190,767 | 6/1965 | Tomany et al. | |
| 3,353,826 | 11/1967 | Traverse | 273/67 A |
| 3,404,885 | 10/1968 | Smith | |
| 3,458,194 | 7/1969 | Coles | 273/67 A |
| 3,638,942 | 2/1972 | Bassett | 273/67 A |
| 4,059,269 | 11/1977 | Tiitola | 273/67 A |
| 4,172,594 | 10/1979 | Diederich | 273/67 A |
| 4,488,721 | 12/1984 | Franck et al. | 273/67 A |
| 4,799,682 | 1/1989 | Hughes | 273/67 A |
| 5,127,649 | 7/1992 | Carbonero | 273/67 A |

FOREIGN PATENT DOCUMENTS

| | | | |
|---|---|---|---|
| 984420 | 2/1976 | Canada | 273/67 A |
| 2353843 | 10/1974 | Fed. Rep. of Germany | 273/67 A |
| 2487208 | 1/1982 | France | 273/67 A |
| 108623 | 9/1943 | Sweden | 273/67 A |

*Primary Examiner*—Mark S. Graham
*Attorney, Agent, or Firm*—Larson and Taylor

[57] ABSTRACT

A hockey stick blade coated with an elastomeric polymer such as polychloroprene to provide a coating having the following characteristics:

| | |
|---|---|
| Elongation (%) | 200 minimum |
| Hardness (Durometer - Shore A) | about 40–90 |
| Resiliency (Height on Shore Resiliometer) | 20 minimum |
| Water Absorption (% by weight) | <1 | exhibits improvement in feel, adhesion, resiliency, water-absorption, wear, and repairability.

8 Claims, No Drawings

COATED HOCKEY STICK BLADE

BACKGROUND OF THE INVENTION

This invention relates to hockey sticks. More particularly, this invention relates to an improved hockey stick having an elastomeric coating on the stick blade.

It is not uncommon to find hockey players cover the stick blade of hockey sticks with a cover material. There are a number of reasons why hockey players cover the stick blade. One reason is to obtain a better "feel" for the puck. Another is to help reduce wear and damage to the blade. Some players believe that blade cover material helps hide the puck which is normally black.

Of the cover materials currently employed, the most popular is hockey tape. Hockey tape is actually a cloth material with an adhesive applied to one or both surfaces. Notwithstanding its prevalent use as a hockey stick blade covering, it has the following shortcomings:
(i) Feel: The current tape products do not possess a yield characteristic that provides the desired soft "feel" to the player. It is believed that this less than satisfactory "feel" is due to insufficient resiliency in the materials that make up present day hockey tapes.
(ii) Water Absorption: Hockey tapes, being cloth-based, absorb a significant amount of water. This water absorption is disadvantageous in that it increases the weight of the stick over time and reduces the adhesion of the tape to the stick blade. With loss in adhesion, the tape soon begins to unravel from the blade, necessitating replacement. Replacement can be a nuisance particularly when it happens during play.
(iii) Wear: Although hockey tape provides some protection against wear, the protection it provides is less than desirable. This is due to the aforementioned high degree of water absorption that characterizes hockey tape.
(iv) Repair difficulty: Hockey tape is typically wrapped continuously around the stick blade. When it begins to become undone, the loose portion can be torn off if it is only a small piece. However, if enough tape has unraveled, the entire winding of tape must be removed and new tape applied. This is a nuisance to many hockey players, especially during play.

Others in the prior art have attempted to overcome the wear and repair problems associated with hockey tape by coating them with either paints or hard plastic materials such as disclosed in U.S. Pat. No. 4,458,721 (Franck et al), U.S. Pat. No. 4,241,115 (Temin) and U.S. Pat. No. 3,353,826 (Traverse). Unfortunately, these materials fail to provide the necessary "feel", actually imparting less feel than hockey tape.

A prior art attempt to solve the unsatisfied feel problem involves the use of a rubber sock. This approach employs a dry, elastomeric sleeve which stretches over and onto the stick blade. It has literally no adhesion to the blade- The bottom of the stick blade receives the most wear, owing to its greater and sometimes quite stressful (as with shooting) contact with the ice surface. Since there is no adhesion of the sock to the blade, when the sock wears through on the bottom, the entire sock falls off. When the sock falls off, the entire sock must be replaced. A minor "touch-up" or repair is not possible.

OBJECT OF THE INVENTION

It is an object of the invention to provide a hockey stick blade with an improved feel, that is, a "feel" better than that of hockey stick tape or prior art painted or plastic coated blades.

Another object of the invention is to provide a hockey stick blade having a coating which provides 2-3 times the resiliency of hockey stick tape but without the wear and repair disadvantages of hockey stick tape.

A further object of the invention is to provide a hockey stick blade coating that exhibits less than 10% by weight water gain compared to approximately 30% by weight water gain for hockey stick tape.

Yet another object of the invention is to provide a hockey stick blade coating exhibiting a resiliency of 30-35 (Shore Resilometer) as compared to a value of 12-15 for hockey stick tape.

A further object of the invention is to provide a hockey stick blade coating exhibiting at least twice the adhesion, as measured by a standard peel strength (ASTM D-413-82) as of hockey stick tape or rubber socks.

Lastly, it is an object of the invention to provide a hockey stick blade coating which, when damaged, can be easily repaired as by a simple "touch-up" application.

SUMMARY OF THE INVENTION

These and other objects of the invention are obtained by a hockey stick comprising a handle and a stick blade, said stick blade having an elastomeric polymer coating covering the surface of said stick blade, said elastomeric coating having the following characteristics:

| Elongation (%) | 200 minimum |
| --- | --- |
| Hardness (Durometer - Shore A) | about 40-90 |
| Resiliency (Height on Shore Resiliometer) | 20 minimum |
| Water Absorption (% by weight) | <1 |

Preferably, the characteristics of the elastomeric coating of the invention are as follows:

| Elongation (%) | 600-1,000 |
| --- | --- |
| Durometer (Shore A) | 60-70 |
| Resiliency (Height on Shore Resiliometer) | 30-35 |
| Water Absorption (% by weight) | <1 |

DETAILED DESCRIPTION OF THE INVENTION

In accordance with the invention, an elastomeric polymer capable of providing a coating having the aforementioned characteristics is applied to a hockey stick blade. The coating can be applied to the hockey stick blade, by immersing the blade in a solution of said elastomeric polymer dissolved in a vaporizable solvent, by spraying the blade with a solution of the elastomer polymer or by other suitable coating methods. The thus-coated blade is then allowed to dry until it is free of solvent. The drying can be carried out at room temperature but elevated temperatures and pressure can be used to facilitate the drying process.

The thickness of the elastomeric coating varies depending upon the particular elastomeric polymer employed, its physical properties and the solvent and amount of solvent utilized- In all cases, however, the selection of polymer and solvent is such that the resulting coating possesses the aforementioned properties. Normally, the thickness of the coating will range from 0.002 to 0.008 inches.

The elastomeric polymers which can be used in the invention can be any of the natural or synthetic elastomeric polymers soluble in a suitable solvent that provides a coating having the aforementioned physical properties. These elastomeric polymers include, for example, natural rubber and synthetic rubbers such as polybutadiene, polyisoprene, polyurethane, ethylene-propylene diene rubber, styrene-butadiene rubber, isobutylene-isoprene rubber and the like. Amongst these rubbers, the preferred elastomer is polychloroprene. A commercially available, particularly preferred polychloroprene is DuPont Neoprene GNA.

The elastomeric polymers can be dissolved in aromatic solvents such as toluene, xylene and benzene; ketones such as acetone, diethylketone, methyl ethyl ketone; and, mixtures of the aforementioned solvents.

The amount of solvent necessary to provide a suitable coating solution will vary depending principally upon the elastomer and solvent used. Generally, however, the proportions solvent to elastomer will fall in the range of 5 to 25 parts solvent:1 part elastomer.

The solution of elastomeric polymer may include conventional reinforcing fillers or pigments, such as carbon black, titanium dioxide and the like, processing aids such as napthenic oil and/or stearic acid, anti-scorch retarding aids such as sodium acetate, antioxidants such as N-phenylbenzenamine, and curing agents such as magnesium oxide and zinc oxide.

In a preferred embodiment of the invention, an aerosol spray composition is used to apply the coating solution. The aerosol spray composition can comprise the aforementioned solution of elastomer polymer in combination with an aerosol propellant. The propellant can be either a liquid or compressed gas having a vapor pressure greater than 101.3 kPa (14.7 psia) at 41° C. Suitable compressed gases include $CO_2$, $N_2O$ and $N_2$, while suitable liquids include ethers such as methyl ether and hydrocarbons such as propane, butane and isobutane.

The hockey stick blade coated with the elastomer polymers pursuant to the invention can be made of wood or any of the synthetic materials presently used in the construction of hockey sticks.

The invention is further illustrated by the following examples. These examples are set forth as an illustration of the invention and should not be construed as a limitation thereof.

EXAMPLE 1

A hockey stick blade of white oak was sprayed with an aerosol composition having the following formulation:

| Ingredient | % By Weight |
| --- | --- |
| Toluene | 45 |
| Methyl Ether | 40 |
| Acetone | 10 |
| Polychloroprene | <5 |
| Carbon Black - pigment and reinforcing filler | <5 |
| Zinc Oxide | <1 |
| Magnesium Oxide | <1 |
| Napthenic Oil | <1 |
| Benzenamine, N-Phenyl | <1 |
| Stearic Acid | <1 |
| Sodium Acetate | <1 | and allowed to air dry for 5 minutes. The process was repeated until the coating reached a thickness of 0.003 inches. The resulting coating possessed the following characteristics:

| | |
| --- | --- |
| Elongation (%) | 750 |
| Hardness (Durometer - Shore A) | 70 |
| Resiliency (Height on Shore Resilometer) | 32 |
| Water Absorption (% by weight) | <1 |

EXAMPLE II

Example I was repeated except the hockey stick blade was of plastic.

EXAMPLE III

Example I was repeated until the resulting coating reached a thickness of 0.006 inches.

EXAMPLE IV

Example I was repeated substituting polyurethane for the polychloroprene.

EXAMPLE V

A hockey stick blade of white oak was dipped into a composition having the following formulation and allowed to air-dry:

| Ingredient | % By Weight |
| --- | --- |
| Toluene | 88 |
| Polychloroprene | 10 |
| Carbon Black - pigment and reinforcing filler | <5 |
| Zinc Oxide | <1 |
| Magnesium Oxide | <1 |
| Napthenic Oil | <1 |
| Benzenamine, N-Phenyl | <1 |
| Stearic Acid | <1 |
| Sodium Acetate | <1 |

The dip and dry process was repeated until the coating reached a thickness of 0.003 inches.

It is claimed:

1. A hockey stick comprising a handle and a stick blade, said stick blade having an elastomeric coating covering the surface of the said stick blade, the elastomeric coating being applied as an aerosol spray composition comprising:

| | |
| --- | --- |
| Toluene | 40–45 |
| Methyl Ether | 40 |
| Acetone | 10 |
| Elastomeric polymer | <5 |
| Carbon Black - pigment and reinforcing filler | <5 |
| Zinc Oxide | <1 |
| Magnesium Oxide | <1 |
| Napthenic Oil | <1 |
| Benzenamine, N-Phenyl | <1 |
| Stearic Acid | <1 |
| Sodium Acetate | <1 | said elastomeric coating having the following characteristics:

| | |
|---|---|
| Elongation (%) | 200 minimum |
| Hardness (Durometer - Shore A) | about 40-90 |
| Resiliency (Height on Shore Resiliometer) | 20 minimum |
| Water Absorption (% by weight) | <1 |

2. A hockey stick according to claim 1 wherein the elastomeric polymer is a synthetic polymer.

3. A hockey stick according to claim 2 wherein the synthetic polymer is polychloroprene.

4. A hockey stick according to claim 1 wherein the elastomeric polymer is polybutadiene.

5. A hockey stick according to claim 2 wherein the synthetic polymer is polyisoprene.

6. A hockey stick according to claim 1 wherein the elastomeric polymer is of natural rubber.

7. A hockey stick according to claim 1 wherein the elastomeric polymer is of polyurethane.

8. A hockey stick according to claim 1 wherein the elastomeric polymer is of ethylene-propylene diene.

* * * * *